United States Patent [19]

Hayakawa et al.

[11] Patent Number: 4,470,308
[45] Date of Patent: Sep. 11, 1984

[54] ARC SCAN ULTRASONIC IMAGING SYSTEM HAVING DIVERGING LENS AND PATH-LENGTH COMPENSATOR

[75] Inventors: Yoshihiro Hayakawa, Sagamihara; Tsutomu Yano; Ryobun Tachita, both of Kawasaki; Hiroshi Fukukita, Tokyo; Kazuyoshi Irioka, Sagamihara; Akira Fukumoto, Tokyo, all of Japan

[73] Assignee: Matsushita Electric Industrial Co., Ltd., Osaka, Japan

[21] Appl. No.: 404,917

[22] Filed: Aug. 3, 1982

Related U.S. Application Data

[63] Continuation-in-part of Ser. No. 277,816, Jun. 26, 1981.

[30] Foreign Application Priority Data

Jun. 27, 1980 [JP] Japan .................................. 55-88129

[51] Int. Cl.³ ............................................ G01N 29/00
[52] U.S. Cl. ....................................... 73/642; 73/626; 73/731; 128/660; 367/150
[58] Field of Search ................. 73/642, 625, 626, 644, 73/631; 128/660; 367/150; 310/335

[56] References Cited

U.S. PATENT DOCUMENTS

Re. 30,443 12/1980 Niklas .
3,168,659  2/1965 Bayre et al. ................ 73/642 X
3,922,907 12/1975 Hurwitz et al. .............. 73/642
3,927,662 12/1975 Ziedonis ................... 73/642 X
3,958,559  5/1976 Glenn et al. ................ 73/642 X
4,043,181  8/1977 Nigam .
4,056,971 11/1977 Valkenberg et al. .......... 73/631
4,140,107  2/1979 Lancée et al. ............... 73/626
4,145,741  3/1979 Nappin ..................... 73/631
4,168,482  9/1979 Sternberg .................. 367/150
4,183,249  1/1980 Anderson .
4,211,948  7/1980 Smith et al. ............... 73/644
4,211,949  7/1980 Brisken et al. ............. 73/642 X
4,217,516  8/1980 Iinuma et al. .............. 73/642
4,242,912  1/1981 Burckhardt et al. ......... 73/626
4,281,550  8/1981 Erikson .
4,297,607 10/1981 Lynnworth et al. ......... 73/642 X
4,325,381  4/1982 Glenn ..................... 128/660
4,340,944  7/1982 Dory ...................... 73/642 X
4,344,327  8/1982 Yoshikawa et al. .......... 73/626
4,356,731 11/1982 Mahony ................... 73/631
4,368,643  1/1983 Tachita et al. ............ 73/606
4,398,423  8/1983 Takahashi ................ 73/631

FOREIGN PATENT DOCUMENTS 56-46390  4/1981 Japan .
2011075  7/1979 United Kingdom .
2016143  9/1979 United Kingdom .
2021767 12/1979 United Kingdom .
2079102  1/1982 United Kingdom .

OTHER PUBLICATIONS

"Intra Operative Real Time Echocardiotomography by a Newly Developed Convex Shaped Transducer", Suzuki et al., Jul. 22–27, 1979, Second Meeting of WFUMB, The Fourth World Congress on Ultrasonics in Medicine, pp. 165–170.

Primary Examiner—Howard A. Birmiel
Attorney, Agent, or Firm—Lowe, King, Price & Becker

[57] ABSTRACT

An ultrasonic imaging system comprises a transducer array including a plurality of elongated piezoelectric transducers successively arranged along a curved surface for emission of diverging beams of acoustic energy and an acoustic diverging lens affixed to the curved surface for increasing the angle of divergence of the emitted acoustic energy. The system includes a source for successively generating burst energy and means for selectively establishing a connection from the energy source to a subarray of the transducers to transmit a beam of acoustic energy therefrom and shifting the connection to the next subarray by at least one transducer in response to the generation of subsequent acoustic energy to cause the emitted acoustic energy to be angulated in an arc scan format. Means are provided for compensating for differences in energy level resulting from the differences in the path-length of the acoustic lens.

8 Claims, 10 Drawing Figures

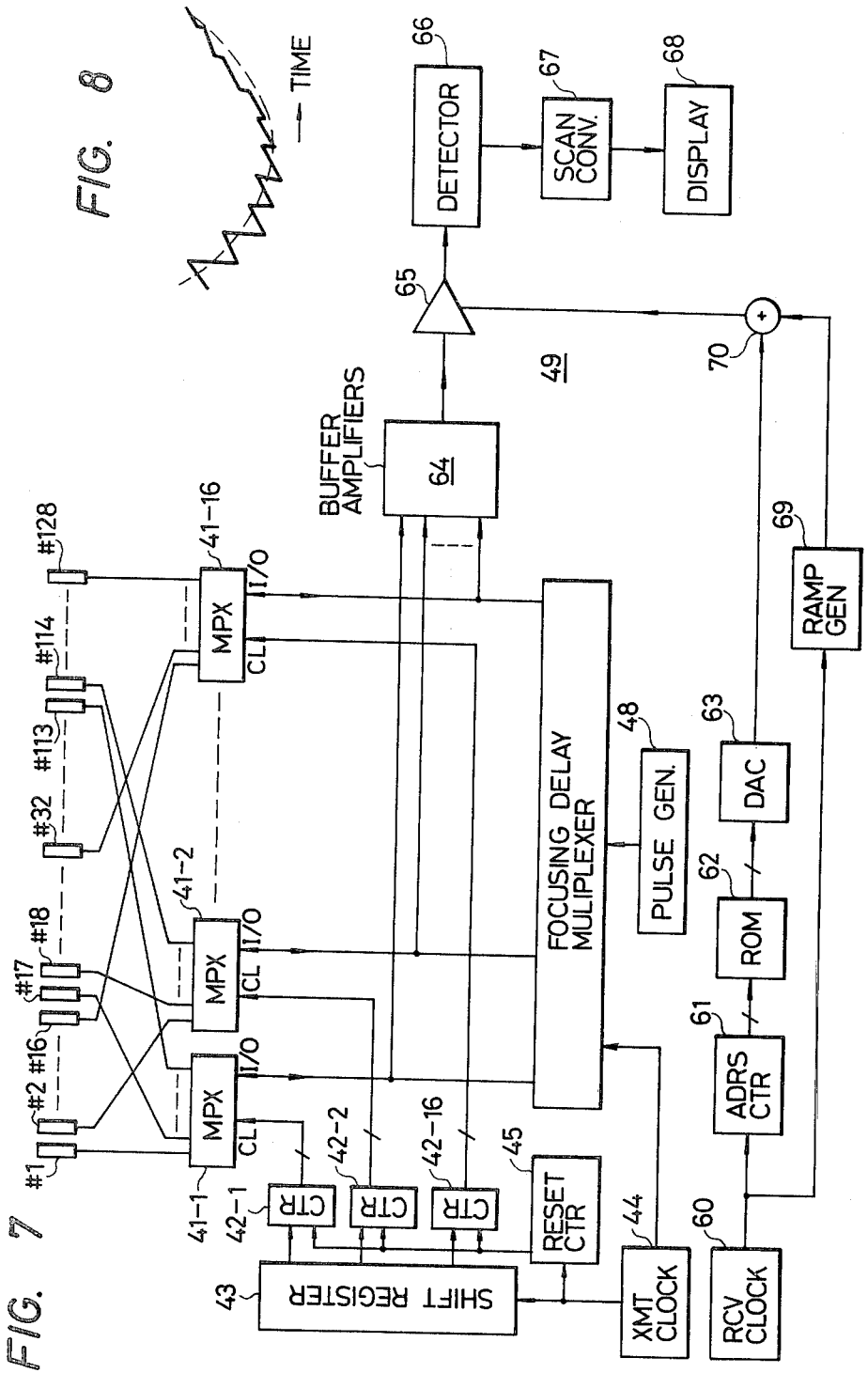

ARC SCAN ULTRASONIC IMAGING SYSTEM HAVING DIVERGING LENS AND PATH-LENGTH COMPENSATOR

CROSS-REFERFENCE TO CO-PENDING APPLICATION

The present application is a Continuation-In-Part application of U.S. patent application No. 277,816 filed June 26, 1981 by Yoshihiro Hayakawa et al., assigned to the same assignee as the present application, now pending.

BACKGROUND OF THE INVENTION

The present invention relates to an ultrasonic imaging system for medical diagnostic purposes, and in particular for an arc scan ultrasonic imaging system having a diverging lens and a path-length compensator which compensates for different amounts of acoustic energy loss encountered as the acoustic beam is angulated at different angles.

Ultrasonic transducer arrays are broadly classified under the categories of linear scan type and sector scan type. Conventional linear scan type arrays comprise piezoelectric transducers, typically 256 in number, which are successively arranged in side by side relation to form a linear array. A group of 16 transducers is selectively activated by delayed burst pulses generated by a commonly shared transmit circuitry so that a focused ultrasonic beam is transmitted. The selected group is successively shifted to the next by at least one transducer element to shift the beam linearly along the array, so that the beam is scanned in a rectangular format. One advantage of the linear scan imaging system relate to the fact that it permits the transmit and receive circuits to be used on a time shared basis. Another advantage is that the linear system provides detailed near-field tomographic images. However, the linear scan system has a disadvantage in that it is incapable of scanning areas behind ribs and the transducer array is itself too bulky for handling.

The transducer array of conventional sector scan systems, on the other hand, usually comprise 32 transducer elements each of which is associated with its own transmit and receive circuitry. The beam is steered in a sector format by the transmit circuit which applies successively delayed pulses. While, the sector scan system is capable of imaging the behind-the-rib areas, the control circuitry is complex and the acoustic beams cluster near the apex of the sector to such a degree that useful tomographic information is not obtained.

SUMMARY OF THE INVENTION

The present invention is therefore to provide a transducer array having transducers arranged on a curved surface for emission of diverging beams of acoustic energy and an acoustic diverging lens for increasing the angle of divergence of the emitted acoustic beams in order to take advantages of the linear and sector scan formats.

However, the acoustic diverging lens has different path-lengths along the array so that the acoustic energy from different transducers differs in amplitude depending on the point of transmission. The provision of the diverging lens thus results in a tomographic image having different intensities depending on the point of transmission of acoustic energy.

Therefore, an object of the present invention is to provide an ultrasonic imaging system for analyzing the internal structure of a body by acoustic energy which compensates for the differences in acoustic energy level arising from the differing path-length of the lens.

According to the invention, the ultrasonic imaging system comprises a transducer array including a plurality of elongated piezoelectric transducers successively arranged along a curved surface for emission of diverging beams of acoustic energy, an acoustic diverging lens affixed to the curved surface and formed of a material having an acoustic impedance substantially equal to the acoustic impedance of the body and a lower sound velocity than the sound velocity of the body for increasing the angle of divergence of the emitted acoustic energy. The system further includes a source for successively generating burst energy, and means for selectively establishing a connection from the energy source to a subarray of the transducers to transmit a beam of acoustic energy therefrom and shifting the connection to the next subarray by at least one transducer in response to the generation of subsequent acoustic energy to cause the emitted acoustic energy to be angulated in an arc scan format. Means are provided for compensating for differences in energy level resulting from the differences in the path-length of the acoustic lens.

Specifically, the compensating means generates a path-length compensating signal of which the magnitude varies as a function of the point of transmission of acoustic beam on the transducer array and modulates the energy level according to the compensating signal.

According to one preferred embodiment of the invention, a ramp generator is provided for periodically generating in response to the generation of burst energy a ramp voltage which increases as a function of time. This ramp voltage is combined with the path-length compensating signal for modulating the level of return echo signals.

According to a further preferred embodiment of the invention, a ramp generator is provided for periodically generating a ramp voltage in response to the burst energy. The time of generation of the ramp voltage is delayed as a function of the path-length compensating signal. The return echo signal is modulated in amplitude according to the instantaneous value of the delayed ramp voltage.

BRIEF DESCRIPTION OF THE DRAWINGS

The present invention will be described in further detail with reference to the accompanying drawings, in which:

FIG. 7 is an illustration of a modification of the steering control system of FIG. 6;

FIG. 8 is an illustration of a waveform used for path-length compensation;

DETAILED DESCRIPTION

Figure 1:
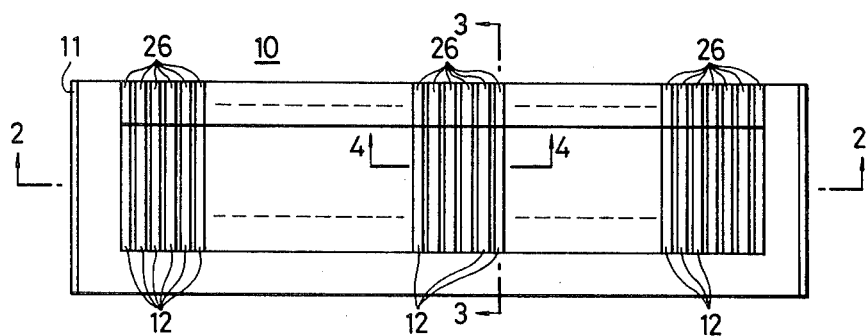
FIG. 1 is an illustration of a top plan view of an ultrasonic transducer array embodying the invention.
Figure 2:
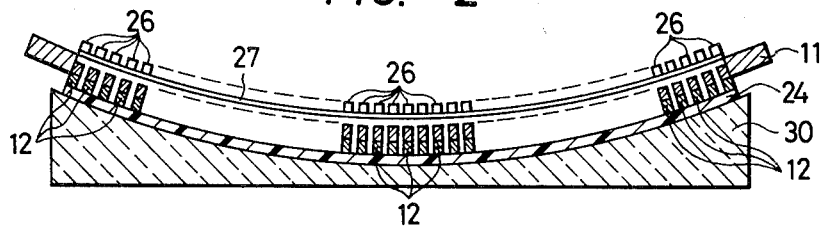
FIG. 2 is an illustration of a cross-sectional view taken along the lines 2—2 of FIG. 1.
Figure 3:
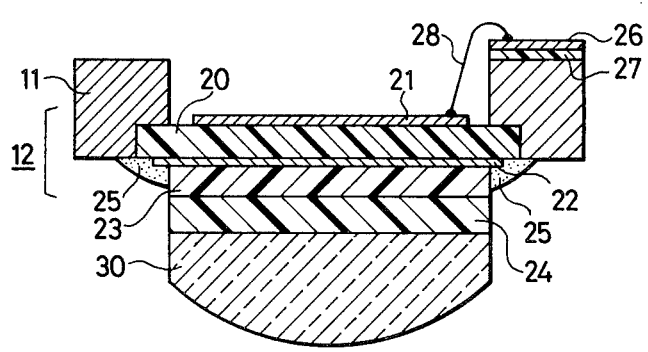
FIG. 3 is an illustration of a cross-sectional view taken along the liens 3—3 of FIG. 1.
Figure 4:
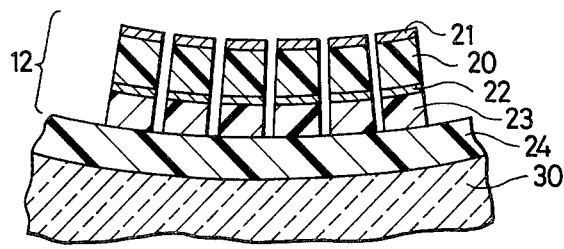
FIG. 4 is an illustration of a cross-sectional view taken along the liens 4—4 of FIG. 1.

An array of piezoelectric transducers embodying the present invention is generally indicated at 10 in FIG. 1. The transducer array 10 comprises a conductive frame 11 which is convexed in the direction of propagation of ultrasonic energy. A plurality of elongated piezoelectric transducers 12 is successively arranged on the convexed frame structure 11 as seen from FIG. 2. As illustrated in detail in FIGS. 3 and 4, each transducer 12 comprises a piezoelectric element 20 which extends transverse to the frame 11 to bridge its parallel side members and connected thereto by a suitable adhesive material. On the upper and lower side faces of the piezoelectric element 20 are electrodes 21 and 22, respectively. The lower electrodes 22 are electrically connected to the side members of the frame 11 by conductive adhesive 25 so that the frame 11 serves as a common electrode of the transducer array 10. In a preferred embodiment, each piezoelectric element 20 is so dimensioned that its width-to-thickness ratio imparts a transverse expansion vibrational mode to the array 10. With this vibrational mode a high sensitivity and excellent bandwidth characteristics are obtained. In a further preferred embodiment, each transducer 12 includes a first impedance matching element 23 which is attached to the lower electrode 22. The transducers 12 are secured to a second, or common impedance matching layer 24 which extends along the length of the frame 11 in contact with the first impedance matching elements 23. Suitable material for the first impedance matching elements 23 is quartz, glass or fused quartz and suitable material for the second impedance matching layer 24 is epoxy resin. The acoustic impedance of the first impedance matching elements 23 is preferably 2.5 to 9.5 times greater than the acoustic impedance of the human body and the acoustic impedance values of the second impedance matching layer 24 is preferably 1.6 to 2.7 times greater than that of the human body.

Figure 5:
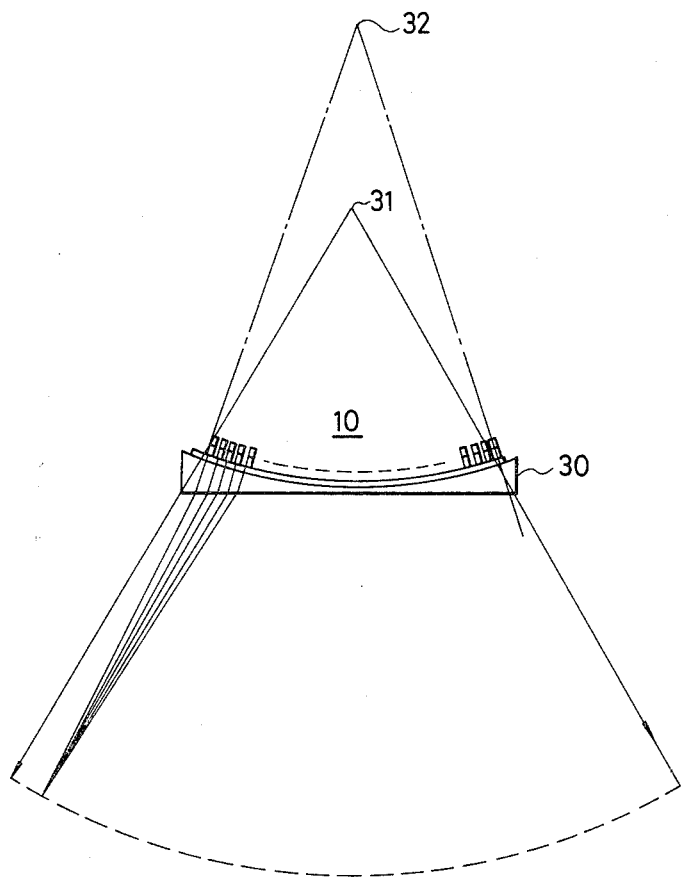
FIG. 5 is a sketch illustrating the diverging acoustic beam scan in an arc field.

A diverging acoustic lens 30 generally of a plano-concave construction is secured to the second impedance matching layer 24 with its plane surface facing toward the human body to define an entry surface for the generated ultrasonic energy. The acoustic lens 30 is formed, preferably, of silicon rubber having substantially the same acoustic impedance as the human body but having such an acoustic property that in the lens 30 the acoustic energy propagates at a speed lower than it propagates in the human body. Because of the increase in sound velocity in the human body, the incident ultrasonic beam is deflected in a direction away from the normal to the array 10 as it impinges on the plane entry surface at an angle thereto as illustrated in FIG. 5, and therefore the scanned beam propagates as if it originates from a point 31 closer to the array 10 rather than from a point 32 from which it would originate if the acoustic lens 30 is not provided. The amount of tomographic information available from the arc scan transducer array of the invention is thus greater than that available with conventional linear scan type arrays. The plane entry surface defined by the acoustic lens 30 assures an intimate contact with the human subject, so that acoustic energy encounters no loss upon entry into and return from the human body. It is seen from FIG. 3 that the acoustic lens 30 preferably has a convexed radiating surface as viewed in the longitudinal direction of the array to provide beam focusing.

Figure 6:
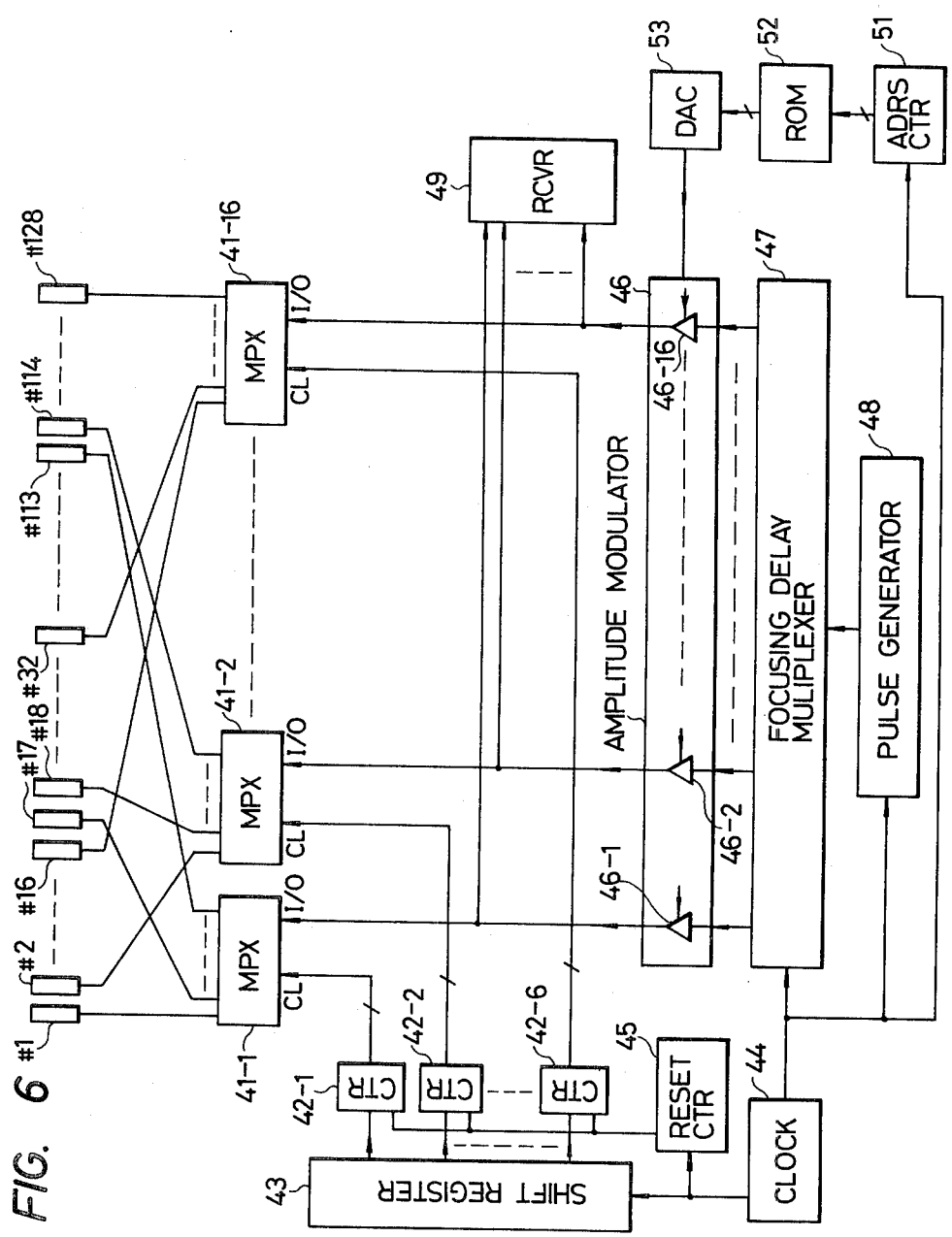
FIG. 6 is an illustration of a steering control system of the arc scan transducer array of FIG. 1.

FIG. 6 is an illustration of a control circuit for driving the transducer array 10 of the invention. For purposes of illustration analog multiplexers 41-1 through 41-16 are provided for the array 10 which includes transducers #1 through #128. These transducers are divided into 16 subgroups of eight transducers each. Each analog multiplexer 41 is provided with eight output terminals for connection to those transducers which are spaced by sixteen elements, with the corresponding output terminals of the multiplexers being connected respectively to adjacent transducers of each transducer group. For example, the #1 output terminals of multiplexers 41-1 to 41-16 are connected respectively to the #1 to #16 transducers, the #2 output terminals being connected respectively to the #17 to #32 transducers, and the #16 output terminals being connected respectively to the #113 to #128 transducers. Counters 42-1 to 42-16 are connected to the inputs of the multiplexers 41-1 to 41-16 respectively to select one of the eight output terminals of the associated multiplexers in response to output signals supplied individually from a shift register 43 which in turn is connected to receive a clock signal from a clock source 44. The counters 42-1 to 42-16 are incremented in response to every 16th clock pulse and cleared by a reset counter 45 in response to every 128th clock pulse. In response to the #1 clock pulse all the counters 42-1 to 42-16 are conditioned so that the #1 output terminals of all the multiplexers 41 are activated to couple their inputs to the transducers #1 to #16. This condition is retained for one clock interval so that upon the occurrence of a #2 clock pulse the transducers #2 to #17 are selected. Therefore, a group of 16 successive transducers is shifted to the next by one transducer element in response to each clock pulse.

A burst of pulses is generated by a pulse generator 48 in response to each clock pulse from source 44. The pulse burst is applied to a focusing delay multiplexer 47. The multiplexer 47 essentially comprises a read only memory from which focusing delay data are retrieved in response to each clock pulse and a plurality of successively arranged variable delay elements which correspond in number to the multiplexers 41-1 to 41-16 to introduce different amounts of delay time to the burst signal in accordance with the data read out of the memory.

According to the invention, an amplitude modulator 46 is provided. This modulator comprises a plurality of gain-controlled amplifiers 46-1 to 46-16 arranged to receive the delayed burst signals to modulate the amplitude of each delayed burst signal in response to a gain control signal. The outputs of the gain-controlled amplifiers 46-1 to 46-16 are respectively coupled to the input/output terminals of the multiplexers 41-1 to 41-16. The gain control signal is derived from a circuit which comprises an address counter 51 coupled to the clock source 44, a read only memory 52 storing path-length compensating data, and a digital-analog converter 53.

The address counter 51 is incremented by the clock pulse and generates an address code for the read only memory 52. The path-length compensation data are read out of the memory 52 in response to each clock pulse. The compensation data represent the amplification gains with which the delayed burst signals are amplified to compensate for differences in attenuation between transmitted beams passing through different go-and-return path-lengths of the lens 30. Therefore, the amount of compensensation given to the beam emerging from the edge portions of the lens 30 is maximum and the one given to the beam emerging from the center of the center of the lens is minimum. The beam emerging from and returning to any point of the lens 30 has an energy level which would be obtained in the absense of the lens 30.

The returning acoustic waves are detected by the 16 transducers of the selected subgroup and passed through multiplexers 41-1 to 41-16 to a receiver 49 which processes the return echo into a form suitable for display.

Figure 9:
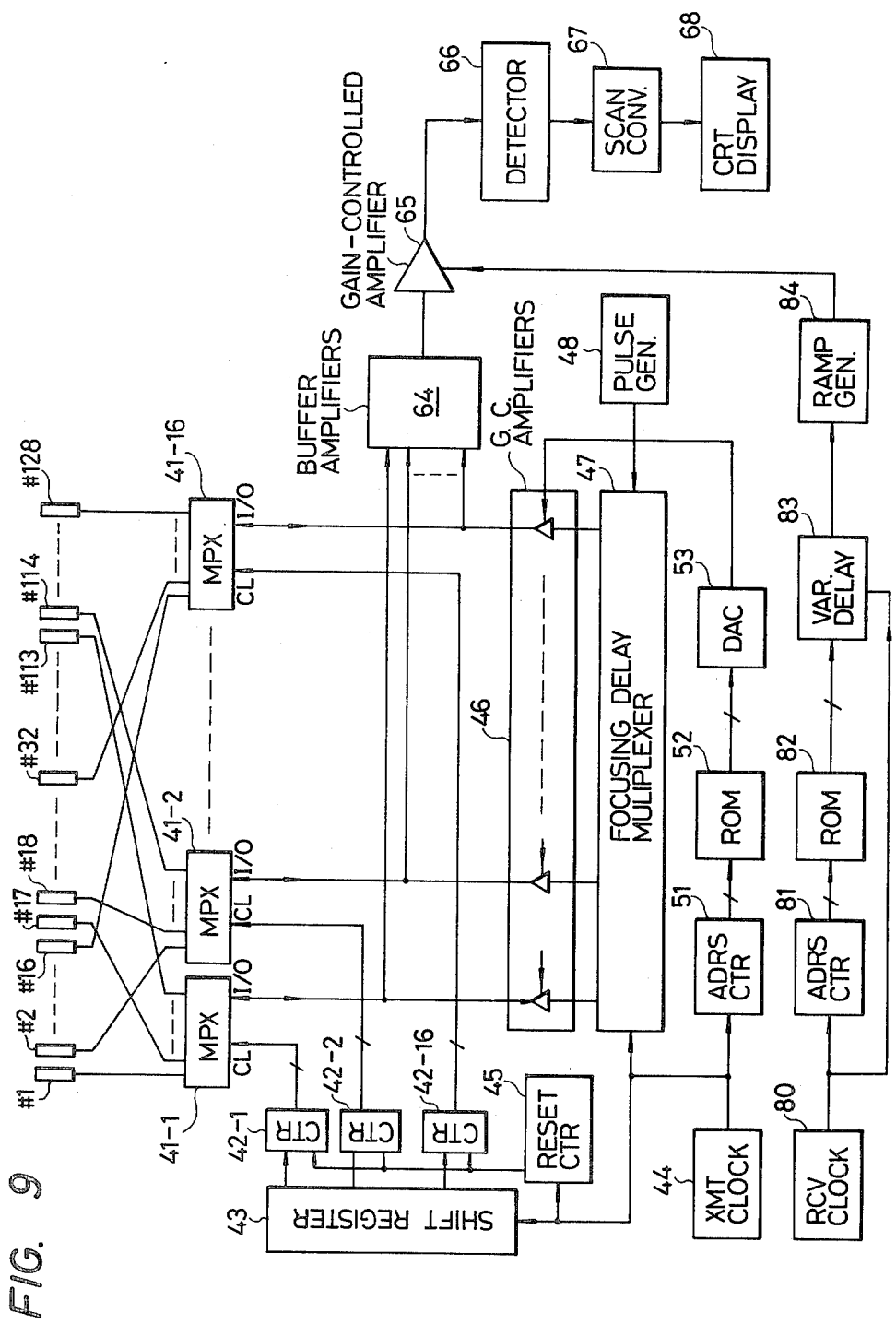
FIG. 9 is an illustration of a further modification of the steering control system of FIG. 6.

FIGS. 7 and 9 are modified embodiments of the invention in which parts corresponding in function to those in FIG. 6 are designated by corresponding numerals. In this embodiment, the amplitude modulator 46 is eliminated and the outputs of the focusing delay multiplexer 47 are directly coupled to the input/output terminals of the multiplexers 41-1 to 41-16. The embodiment of FIG. 7 employs a receive clock source 60, an address counter 61 for generating an address code in response to each receive clock, a read only memory 62 storing path-length compensating data which are read in response to the address code for application to a digital-analog converter 63. The receiver 49 includes buffer amplifiers 62 coupled respectively to the input/output terminals of the multiplexers 41-1 to 41-16, a gain-controlled amplifier 65, a detector 66, a scan converter 67 and a CRT display unit 68. The receive clock source 60 generates a clock pulse which is delayed with respect to the transmit clock pulse by an amount sufficient to allow the transmitted acoustic beam to return from different tissues in the human body to the transducer array 10.

A ramp generator 69 is coupled to the receive clock source 60 to generate a ramp voltage in response to each receive clock pulse. This ramp voltage is applied to an input of an adder 70 where it is summed with a path-length compensating signal from the digital-analog converter 63. As indicated by a dotted curve in FIG. 8, the amplitude of the compensating signal varies nonlinearly as a function of time from a maximum value corresponding to the beam emanating from the edge portions of the lens 30 to a minimum value corresponding to the beam emanating from the center of the lens.

The combined output of the adder 70, as indicated by a solid-line curve in FIG. 8, is applied to the control terminal of the gain-controlled amplifier 65 to which a combined echo signal is fed from the buffer amplifiers 64. The echo signal is modulated in amplitude by the amplifier 65. Since the ramp voltage increases as a function of time, the amplification gain increases as a function of distance from the array 10, so that echos returning from tissues at greater distances are amplified with a higher gain. Added to this is the path-length compensation provided by the output of the digital-analog converter 63.

Differences in attenuation between echos resulting from differences in the echo's arrival time and the lens's path-length are thus compensented to produce a high image contrast. The compensated echo signal is applied to the detector 66 which removes its high frequency components to detect the amplitude variations. The scan converter 67 may include an analog-digital converter for converting the analog echo signal to digital echo data and a random access memory in which the digital echo data is written column by column and read out of the memory row by row in such a timing that the arc scan format is converted to a raster scan format. The echo data in the raster scan format is converted to a corresponding anlog signal and applied to the display unit 68 to modulate the intensity of a cathode ray beam which is scanned in raster form in a conventional manner to produce a tomographic image.

The embodiment of FIG. 9 provides path-length compensation both for transmission and reception. For this purpose, the memory 52 contains transmit path-length compensation data. The FIG. 9 embodiment includes a receive clock source 80, an address counter 81 coupled thereto to generate an address signal, a read only memory 82 responsive to the address signal to generate "receive" path-length compensation delay data which are used during receive mode for compensating for the return path-lengths of the lens 30. A digital variable delay circuit 83 is coupled to the output of the read only memory 82 and to the receive clock source 80 to introduce a delay time to the receive clock pulse according to the delay data.

Figure 10:
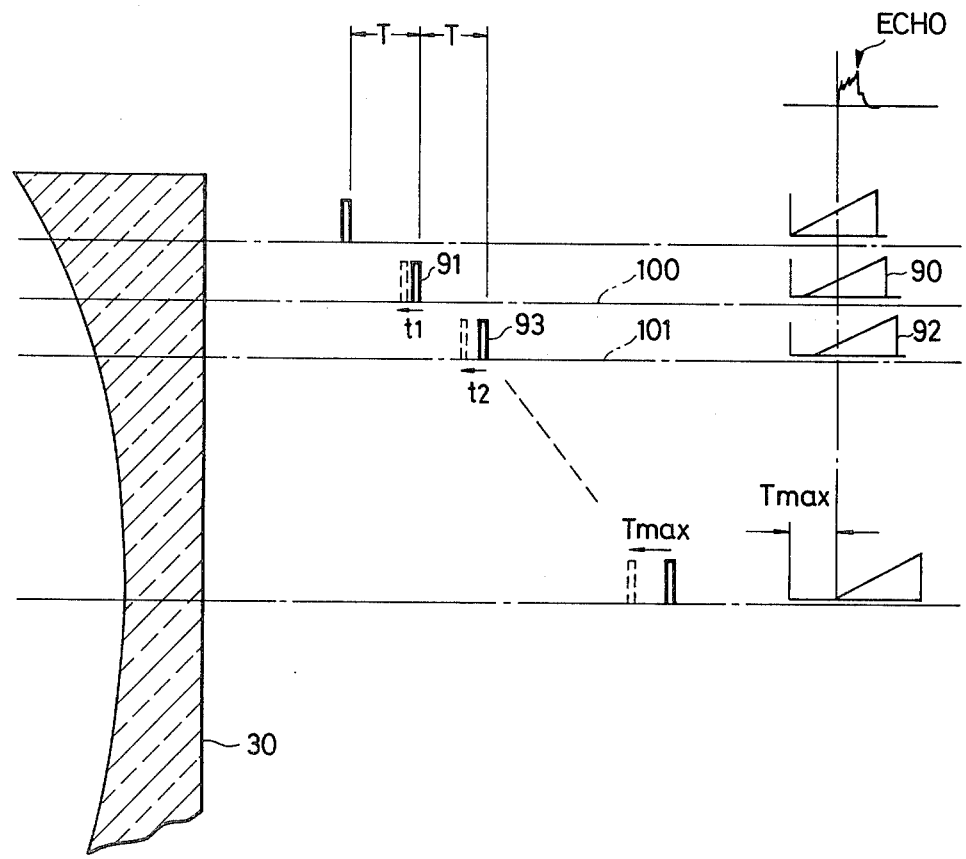
FIG. 10 is an illustration of delayed pulses used for path-length compensation associated with the embodiment of FIG. 9.

As illustrated in FIG. 10, the receive clock pulses are delayed in the delay circuit 83 by a maximum interval Tmax when the echo is received at the center area of the lens 30 and delayed by a minumum, or zero when the echo is received at the peripheral areas. More specifically, the delay time is successively decreased from the maximum to the minimum as the beam is steered in a direction away from the center of the lens 30.

The delayed pulse is applied to a ramp generator 84 the output of which is coupled to the control terminal of the gain-controlled amplifier 65.

Therefore, echos returning on different paths rise on different portions of the slope of the ramp as seen from FIG. 10. For example, the echo returning on a path 100 (FIG. 10) rises on a middle portion of a ramp voltage 90 which is generated in response to a receive clock 91 delayed by $t_1$, and the echo returning along a path 101 rises on a portion near the lower edge of a ramp 92 which is generated in response to a clock 93 delayed by t, and so on. It will be seen that the echo signal supplied from the buffer amplifers 64 is amplified with higher gains for echos passing through greater path-lengths of the lens 30. The embodiment of FIG. 9 is advantageous if the lens 30 imparts such a large value attenuation to the passing energy that the amount of compensation provided only for transmission or reception is insufficient.

What is claimed is:

1. An ultrasonic imaging system for analyzing the internal structure of a body by acoustic energy comprising:

a transducer array including a plurality of elongated piezoelectric transducers successively arranged along a curved surface for emission of diverging beams of acoustic energy;

an acoustic diverging lens affixed to said curved surface and formed of a material having an acoustic impedance substantially equal to the acoustic impedance of said body and a lower sound velocity than the sound velocity of said body for increasing the angle of divergence of said emitted acoustic energy, said diverging lens having a first curved surface that is complementary to the curved surface of the array and an opposite surface that is generally flat and adapted to contact the body, said lens diverging the acoustic energy outwardly to enable the emitted beams to scan and wider region of the body than is achieved without the diverging lens;

a source for successively generating burst energy;

means for selectively establishing a connection from said source to a subarray of said transducers to transmit a beam of acoustic energy therefrom and shifting the connection to the next subarray by at least one transducer in response to the generation of subsequent acoustic energy to cause the emitted acoustic energy to be angulated in an arc scan format; and means for compensating for differences in energy level resulting from the differences in the path-length of said acoustic lens.

2. An ultrasonic imaging system as claimed in claim 1, wherein said compensating means comprises means for generating a path-length compensating signal of which the magnitude varies as a function of the point of transmission of acoustic beam on said array, and means for modulating the energy level according to said compensating signal.

3. An ultrasonic imaging system as claimed in claim 2, wherein said means for generating compensating signal comprises a memory storing path-length compensating digital data, means for periodically reading the path-length compensating data out of said memory, and means for converting said digital data to a corresponding analog signal for controlling said modulating means.

4. An ultrasonic imaging system as claimed in claim 2 or 3, wherein said modulating means is arranged to modulate the amplitude of the burst energy generated by said source.

5. An ultrasonic imaging system as claimed in claim 1, further comprising means for periodically generating a ramp voltage in response to the generation of said burst energy, and wherein said compensating means comprises means for generating a path-length compensating signal of which the magnitude varies as a function of the point of emission of the acoustic beams, means for combining said periodic ramp voltage and said compensating signal, and means for modulating the level of signals representing echos returning from the inside of said body according to the output of said combining means.

6. An ultrasonic imaging system as claimed in claim 1, further comprising means for periodically generating a ramp voltage in response to the burst energy, and wherein said compensating means comprises:

means for generating a path-length compensating signal of which the magnitude varies as a function of the point of emission of said acoustic beams;

means for delaying the time of generation of said ramp voltage with respect to the time of reception of echo returning from the inside of said body as a function of said compensating signal; and means for modulating the amplitude of a signal representing said echo as a function of the instantaneous value of said delayed ramp voltage.

7. An ultrasonic imaging system as claimed in claim 6, wherein said means for generating path-length compensating signal comprises a memory storing path-length compensating data, means for reading the path-length compensating data out of the memory, and wherein said delaying means comprises a clock source for generating clock pulses for triggering said ramp voltage generating means and a variable delay circuit responsive to the data read out of the memory for introducing a variable delay time to said clock pulse.

8. An ultrasonic imaging system as claimed in claim 6 or 7, wherein said compensating means further comprises means for generating a second path-length compensating signal and means for modulating the amplitude of the burst energy generated by said source in response to said second path-length compensating signal.

* * * * *